Patented July 5, 1938

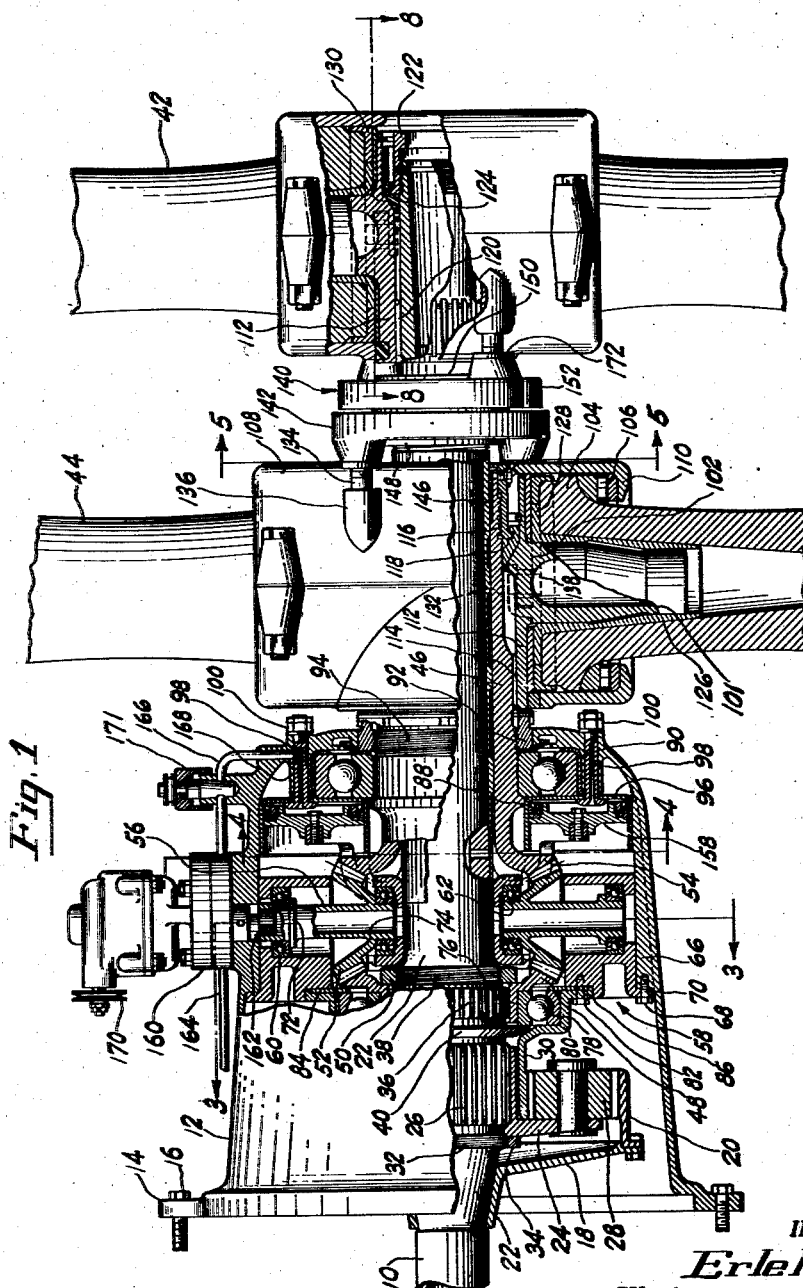

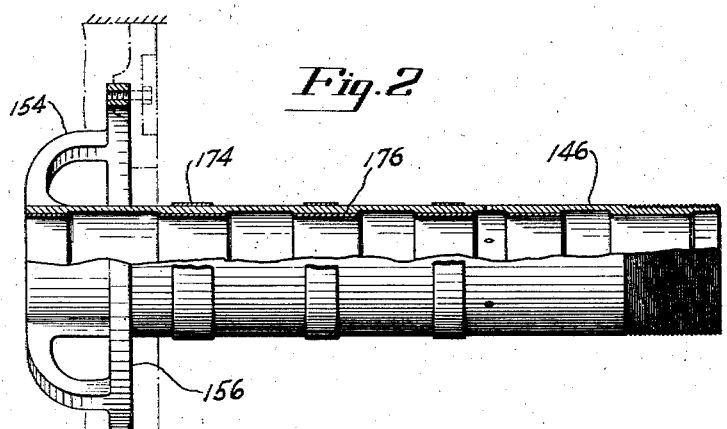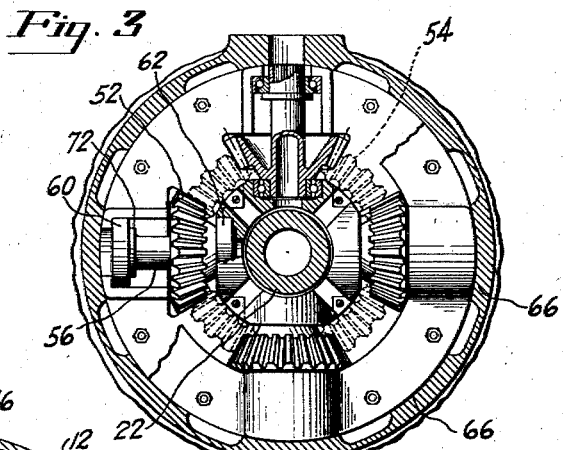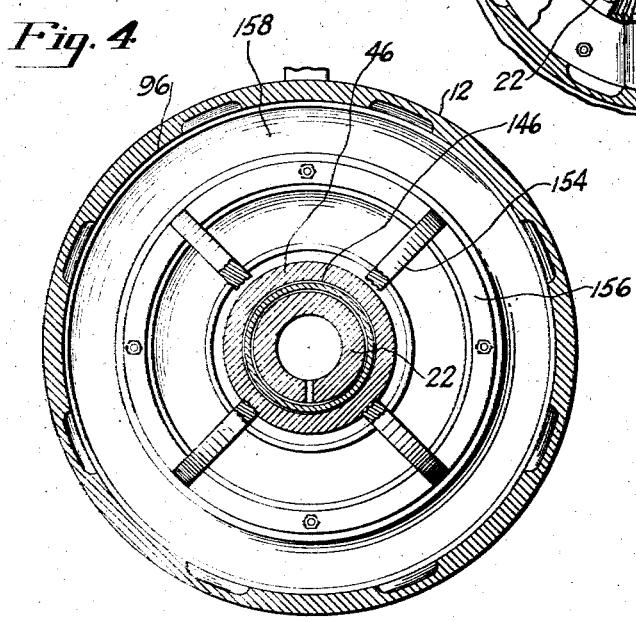

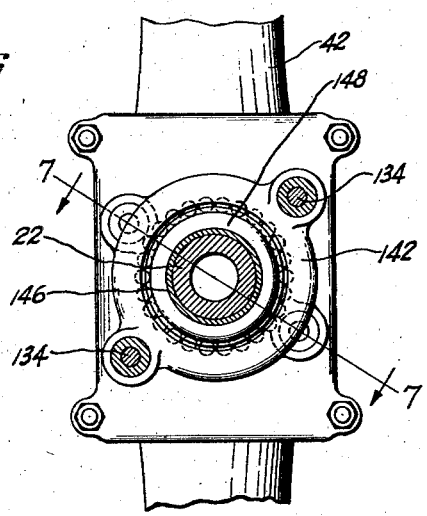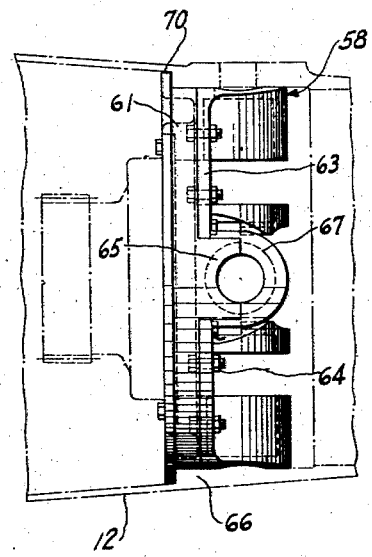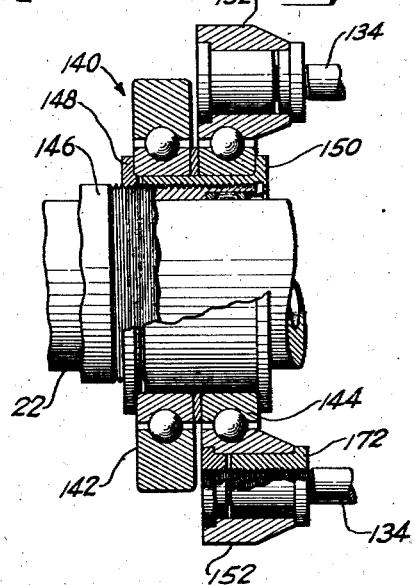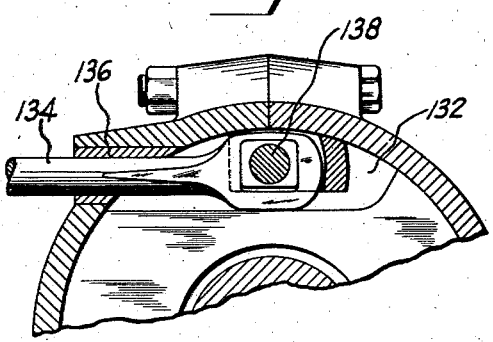

2,123,057

UNITED STATES PATENT OFFICE 2,123,057

OPPOSITELY ROTATING COAXIAL PROPELLERS

Erle Martin, West Hartford, Conn., assignor to United Aircraft Corporation, East Hartford, Conn., a corporation of Delaware Application February 29, 1936, Serial No. 66,392

10 Claims. (Cl. 170—135.6)

This invention relates to improvements in oppositely rotating coaxial propellers and has particular reference to improvements in mounting, driving, and pitch adjusting means for oppositely rotating coaxial controllable pitch propellers for airplane propulsion.

An object of the invention resides in the provision of means for securely supporting a pair of coaxial propellers at one end of a power plant such as an internal combustion engine.

A further object resides in the provision of suitable means operating in conjunction with the power plant for driving said propellers in opposite directions of rotation about the same axis.

A still further object resides in the provision of means in combination with the supporting and driving means for rotating the propeller blades to adjust the pitch of the propellers according to predetermined operating conditions.

An additional object resides in the provision of propeller supporting, driving, and pitch adjusting means of the character described, having an extremely light weight and a mechanical efficiency which incurs the minimum loss of engine power.

Other objects and advantages will be more particularly pointed out hereinafter or will become apparent as the description proceeds.

In the accompanying drawings in which like reference numerals designate similar parts throughout, there is illustrated a suitable mechanical embodiment of what is now considered to be the preferred form of the invention. The drawings, however, are for the purpose of illustration only and are not to be taken as limiting the invention, the scope of which is to be measured entirely by the scope of the appended claims.

In the drawings, Fig. 1 is a side elevational view of a pair of oppositely rotating coaxial controllable pitch propellers with supporting, driving, and pitch adjusting means therefor, constructed according to the idea of this invention, certain portions of the construction being broken away and shown in section to better illustrate the construction thereof.

Fig. 2 is an elevational view of a sleeve and piston member constituting an element of propeller pitch adjusting mechanism, a portion of the member being broken away and shown in section to better illustrate the construction thereof.

Fig. 3 is a sectional view on the line 3—3 of Fig. 1.

Fig. 4 is a sectional view on the line 4—4 of Fig. 1.

Fig. 5 is a sectional view on the line 5—5 of Fig. 1.

Fig. 6 is a side elevational view of the fixed cage which carries the reversing pinions.

Fig. 7 is a vertical sectional view through the thrust bearings which transmit the pitch adjusting forces to the propeller blades and Fig. 8 is a sectional view of a fragmentary portion of a propeller hub on the line 8—8 of Fig. 1 and shows the member which transmits the propeller adjusting force from the thrust bearings shown in Fig. 7 to the propeller blade roots.

Referring to the drawings in detail, the numeral 10 indicates a power shaft such as the crankshaft of an internal combustion engine used for the propulsion of aircraft. The driving end of this power shaft 10 projects into a nose piece or gear casing 12 secured upon the forward side of the engine by suitable means such as the lugs 14 and cap screws 16. Upon the forward end of the driving shaft 10 there is secured a bell housing 18 fixed against relative rotation with respect to the shaft. This bell housing carries the outer ring gear 20 of a planetary reduction gear interposed between the drive shaft 10 and a propeller shaft 22 coaxial with the drive shaft. A cage member 24 is fixed upon the rear end of the propeller shaft by means of a splined section 26 and carries a plurality of planetary gears 28 which mesh with gear teeth provided on the inner surface of the ring gear 20 and with gear teeth provided on the outer surface of a fixed inner gear 30.

When the driving shaft 10 rotates, it rotates the bell housing 18 and outer ring gear 20. Rotation of the ring gear 20 causes the planetary gears 28 to rotate and revolve about the inner fixed gear 30 carrying with them the cage 24 which is non-rotatably secured to the end of the propeller shaft 22. As the number of gear teeth in the ring gear is much greater than the number of teeth in the fixed gear, the effect of these two gears upon the planetary gears rolling between them is to decrease the speed at which the planetary gears revolve around the inner gear with respect to the rate of rotation of the ring gear so that the cage 24 rotates at a slower rate than the ring gear 20 and bell housing 18, thus providing a speed reduction between the power shaft 10 and the propeller shaft 22. This is, in general, a usual and well-known type of planetary reduction gear, and it is believed that a further description thereof is not necessary for the purpose of this disclosure. Somewhat rearwardly of the splined portion 26, the propeller shaft is provided with a screw threaded portion 32 upon which is threaded a nut 34 for retaining the cage 24 in position upon the splined portion 26 in a manner well-known in the art.

Forwardly of the splined portion 26, and spaced therefrom the propeller shaft is provided with another splined portion 36 adjacent to which is a screw threaded portion 38, and between the two splined portions the shaft is provided with a radially extending shoulder or collar 40 for a purpose which will presently appear.

The propeller shaft extends forwardly from the screw threaded portion 38 and beyond the gear casing 12 and carries upon its extreme outer end a propeller 42. Between the propeller 42 and the gear casing 12 there is a second propeller 44 mounted upon a shaft in the form of a sleeve 46, the two propellers 42 and 44 being designed to rotate about the axis of the shaft 22 in opposite directions. This opposite rotation of the two propellers is obtained by means of a reversing transmission disposed between the shafts 22 and 46.

Upon the splined portion 36 of the shaft 22 there is secured an annular gear member 48 locked in position upon the splined portion 36 by means of a nut 50 threaded upon the screw threaded portion 38. This annular gear 48 meshes with a plurality, in the present construction four, beveled gears 52 which in turn mesh with an annular gear 54 formed upon the rear end of the sleeve 46. The beveled gears 52 are mounted to rotate about fixed axes so that when rotated by the driving gear 48 on the propeller shaft they will rotate the driven gear 54 on the propeller carrying sleeve 46 in a direction opposite to the direction of rotation of the driving gear 48. Thus as the propeller 42 is non-rotatably mounted upon the propeller shaft 22 so that it will rotate in the same direction as the shaft and as rotation of the shaft 22 in one direction drives the sleeve 46 to which the propeller 44 is non-rotatably secured in the opposite direction, it will be seen that upon rotation of the propeller shaft by the power shaft 10, the two propellers 42 and 44 will be caused to rotate in opposite directions with respect to each other.

Each of the beveled gears 52 is fixed upon, or formed integrally with, a coaxial bearing spindle 56 mounted in a fixed cage generally indicated at 58 by means of spaced anti-friction bearings 60 and 62, the bearing 62 being preferably disposed upon the opposite side of the respective gear 52 from the associated bearing 60.

The fixed cage 58, particularly illustrated in Fig. 6, is a split cage formed of two annular members 61 and 63 divided along a plane including the axes of the spindles 56 so that the spindles and associated anti-friction bearings may be assembled within the cage, the two members of the cage are rigidly secured together in assembled relation by suitable means such as the bolts 64. The member 61 is formed along one side thereof with a plurality of outwardly extending spaced bearing portions 65 and the member 63 is formed with spaced half bosses 67 which cooperate with the bearing portions 65 to form bearing caps for the bearings in which the gears 52 are mounted when the two parts of the cage and the gears are assembled. The assembled cage with the beveled gears and bearings is fixed in the gear casing 12 by means of an annular bearing portion comprising the inner surfaces of ribs 66 provided within the gear case, and cap screws 68 extending through an outwardly extending flange 70 provided along one edge of the cage and into the adjacent ends of the internal ribs 66. Axial thrust of the beveled gears 52 and spindles 56 is transmitted to the anti-friction bearings 60 and 62 by means of a shoulder 72 formed on the spindle within the bearing 60 and bearing against the inner race of the same and a shoulder 74 formed upon the inner side of the gear 52 and bearing against the inner race of the anti-friction bearing 62.

The annular gear member 48 is provided with an annular flange 76 overlying the splined portion 36 of the shaft 22 and upon this flange or skirt there is mounted the inner race of a ball thrust bearing 78, the outer race of which is clamped within a bell housing 80 constituting the skirt portion of the fixed inner gear 30. This inner gear 30 is rigidly secured to the fixed cage 80 by suitable means such as the cap screws 82 and is independently restrained against rotation by the interlocking splines 84 formed on an outwardly extending flange 86 of the gear member 48 and the adjacent annular surface of the fixed cage. The annular collar 40 formed on the propeller shaft 22 between the splined portions 26 and 36 bears against the inner race of the ball thrust bearing 78 to restrain the shaft against axial movement forwardly of the gear casing 12, movement in a rearward direction being resisted by the nut 50 which bears against the skirt portion 76 of the gear 48 upon which the inner race member is disposed.

The sleeve shaft 46 is provided forwardly of the gear 54 with an annular shoulder 88 which bears against one side of the inner race of a ball thrust bearing 90, which inner race is clamped against the shoulder 88 by a nut 92 threaded upon a screw threaded portion 94 formed on the sleeve so that the inner race is held immovable with respect to the sleeve shaft 46. The outer race of this ball thrust bearing is immovably secured in the forward end of the gear casing 12 by means of an annular cylinder 96, the purpose of which will presently be described, and clamp bolts 98 extending through the cylinder and the forward end of the gear casing and secured in position by nuts 100. Thus the sleeve shaft 46 is restrained against axial movement with respect to the gear casing 12. It will be observed that the ball thrust bearings 78 and 90 are disposed upon opposite sides of the reversing transmission so that thrust loads exerted by the transmission gears will be taken by these thrust bearings and that, at the same time, the thrust bearings serve the additional purpose of restraining the two propeller shafts against axial movement with respect to the gear casing, and thus transmit the forward thrust developed by the propellers to the gear casing and in turn to the engine and the vehicle upon which the engine is mounted.

In the form of the invention illustrated, each of the propellers 42 and 44 is a controllable pitch propeller, that is, the propeller blades may be rotated about their longitudinal axes to alter the pitch adjustment of the propellers. For this purpose each of the blades is provided with a hollow base portion surrounding an arm as indicated at 101 of a driving spider or hub portion 102 and terminating in an outwardly extending flange 104 which bears against an annular thrust bearing 106 secured in the end of a two part blade retaining barrel 108 by means of an inturned flange 76

110 so that the propeller may be driven to rotate about the axis of the propeller shaft and at the same time the blades will be free to rotate about their own longitudinal axes for pitch changing adjustment. The spider arms 101 are formed integrally with cylindrical hub portions 112 which are rigidly secured upon the propeller driving shaft against relative rotation with respect thereto, the cylindrical portion of the spider or hub portion 102 constituting a portion of the propeller 44, being secured upon the sleeve 46 by means of a set of tapered splines 114 at the rear end thereof and a nut 116 screw threaded upon the end of the sleeve 46 and bearing against a shoulder 118 on the cylindrical portion of the spider to force the tapered splines 114 into wedging relation. The cylindrical portion 112 of the similar spider forming a component part of the propeller 42, is similarly secured upon the end of the propeller shaft 22 by means of the tapered splines 120 and the nut 122 which bears against an annular shoulder 124 formed within the cylindrical portion 112 and forces the tapered splines 120 into wedging relation.

Bearing sleeves as indicated at 126 are preferably interposed between the interiors of the hollow propeller blades and the corresponding spider arms 102, and these bearing sleeves are provided with flanges as indicated at 128 which underlie the inner ends of the propeller blades. Annular ring members as indicated at 130 are also applied to the inner ends of the propeller blades and maintained against rotation with respect to the blades by suitable interlocking engagement with the periphery of the flanges 128 of the bearing sleeves and each of these annular members is provided in one side thereof with a pocket 132 which receives the inner end of a shaft 134 extending through a suitable aperture 136 provided in the corresponding barrel member 108 from the exterior of the barrel member into the pocket 132 within which it is retained by a pivot pin 138 so that a movement of the shaft 134 in an axial direction will rotate the propeller blade to which it is attached about the longitudinal axis of the blade.

As the form of the invention illustrated utilizes two two-blade propellers, it will be obvious that there will be four propeller rotating shafts extending from the hubs of these propellers. As illustrated in Fig. 1 the propellers are so mounted that all four of these shafts project into the space between the two propellers and are there connected to a suitable operating mechanism generally indicated at 140, and particularly illustrated in Fig. 7.

The relation of the propeller actuating shafts 134 to each other is particularly illustrated in Fig. 5 wherein it is shown that the shafts connected to the same propeller are disposed diametrically opposite to each other and lie on opposite sides of a plane including the longitudinal axes of the propeller blades and the axis of the propeller shafts and that the adjusting shafts of the two propellers are disposed at 90° from each other when the two propellers happen to be parallel to each other. From this description it will be seen that a movement of all of the adjusting shafts in the same direction will rotate the two opposite blades of the same propeller in opposite directions to increase or decrease the pitch of the propeller and will rotate the blades of the two propellers so that the pitch of both propellers will be increased or decreased at the same time.

The connecting member generally indicated at 140 with which the four blade adjusting shafts 134 are operatively associated consists of a pair of ball thrust bearings 142 and 144 having their inner races rigidly secured upon the screw threaded end of a sleeve 146 by means of a pair of oppositely disposed nuts 148 and 150, the outer races of these ball thrust bearings being provided with lugs as indicated at 152 to which the blade rotating shafts 134 are secured. Each of the outer bearing members is secured to the two blade rotating shafts of the adjacent propeller so that the two propellers may rotate freely, as far as the connecting member 140 is concerned, with respect to each other, and, at the same time, an axial movement of all of the blade rotating shafts can be obtained by a single operating mechanism.

The sleeve 146 is disposed between the propeller shaft 22 and the propeller carrying sleeve 46 and extends within the gear casing 12 to a position between the annular gears 48 and 54. At its inner end this sleeve is provided with integral curved arms 154 particularly illustrated in Fig. 2 which extend around the annular gear 54 between the planetary gears 56 and are joined at their outer ends to an integral annular ring 156. This ring is rigidly secured to an annular piston 158 reciprocably disposed in the annular cylinder 96 which is secured to the forward end of the gear casing 12 by means of the bolts 98.

From this description, it will be observed that the admission of hydraulic fluid to the space between the annular piston 158 and the closed end of the annular cylinder 98 will move the piston in the cylinder and slide the sleeve 146 in an axial direction between the drive shafts of the two propellers, and that this axial sliding of the sleeve 146 will move the connecting member 140 and the associated blade turning shafts 134 to adjust the pitch angle of the propeller blades. The propeller blades are so designed that upon draining of the hydraulic fluid from the cylinder 96, centrifugal forces set up in the blades by the rotation of the propellers will tend to rotate the blades about their longitudinal axes to their low pitch condition.

The flow of hydraulic fluid to the cylinder 96 is controlled by means of a centrifugal governor 160 mounted upon the gear casing 12 and having a driving connection 162 with one of the spindles 66 of the planetary gears of the reversing transmission. The fluid may be led to a governor controlled valve through a suitable conduit 164 and from the valve through a suitable conduit 166 to a bore 168 provided in one of the cylinder clamp bolts 98, which bore leads to the interior of the annular cylinder. Preferably the governor 160 is provided with a manual control device 170 by means of which the propellers may be moved to and retained in either their limiting high pitch or low pitch condition. The numeral 171 indicates a stop cock interposed in the hydraulic fluid line 166 between the governor and the propeller pitch controlling mechanism. This stop cock is arranged to be manually controlled from the airplane cockpit and serves when closed to stop the flow of hydraulic fluid to and from the propeller pitch changing mechanism and thus hold the pitch of the propellers at any desired adjustment.

The blade rotating shafts 134 are preferably connected to the connecting member 140 by means of adjustable connections such as screw threads upon the ends of the shafts and rotatable bushings 172 screw threaded upon the shafts and retained against axial movement in the lugs 152, to provide a centering adjustment for the various propeller blades so that they can all be brought to the same original angular adjustment. If desired, a suitable stop means may be provided to limit the rotation of the blades in both directions.

The sleeve member 146 is preferably provided with bearing areas 174 on the exterior thereof and 176 on the interior thereof formed of a suitable lubricating material to reduce the frictional resistance to movement of the sleeve between the two propeller drive shafts.

While there has been illustrated and described a particular mechanical embodiment of the idea of the invention, it is to be understood that the invention is not limited to the particular mechanical embodiment so illustrated and described, but that such changes in the size, shape, and arrangement of parts may be resorted to as come within the scope of the appended claims.

As the invention has now been described so that others skilled in the art may clearly understand the same, what it is desired to secure by Letters Patent is as follows:

1. The combination of an engine, an engine power shaft, a propeller shaft driven by said power shaft, a controllable pitch propeller on said propeller shaft, a sleeve rotatable on said propeller shaft, a second controllable pitch propeller carried by said sleeve, means comprising a pair of oppositely disposed beveled gears and a plurality of pinion gears mounted in a fixed cage for rotating said sleeve in a direction opposite to the direction of rotation of said propeller shaft, and means for adjusting the pitch of said controllable pitch propellers comprising, an axially movable sleeve disposed between said propeller carrying sleeve and said propeller shaft and having a connection at one end to said propellers, the opposite end of said axially movable sleeve having a connection extending through said fixed cage and connected with means for moving the same to control the pitch setting of said propellers.

2. The combination of an engine, an engine power shaft, a propeller shaft driven by said power shaft, a controllable pitch propeller on said propeller shaft, a sleeve coaxial with said propeller shaft, a second controllable pitch propeller carried by said sleeve, means for rotating said sleeve in a direction opposite to the direction of rotation of said propeller shaft, and means for adjusting the pitch of said controllable pitch propellers comprising, an axially movable bearing sleeve between and in contact with said propeller shaft and said propeller carrying sleeve, a connection between one end of said axially movable sleeve and the blades of said propellers, and means connected with the other end of said axially movable sleeve for moving the same to adjust the pitch of said propeller blades.

3. The combination of an engine, an engine power shaft, a propeller shaft driven by said power shaft, a controllable pitch propeller on said propeller shaft, a second controllable pitch propeller carried by said sleeve, means for rotating said sleeve in a direction opposite to the direction of rotation of said propeller shaft, and an axially movable sleeve disposed between said propeller shaft and said propeller carrying sleeve, terminating at one end between said propellers and operatively connected therewith, said sleeve providing a bearing support for said shaft and a relatively non-rotatable bearing between the oppositely rotating propeller shaft and propeller carrying sleeve and at the same time providing a means for controlling the pitch setting of said controllable pitch propellers.

4. In combination with an engine and a pair of controllable pitch propellers located at one side of said engine, means between said engine and one of said propellers for driving said one propeller in the same direction as the direction of rotation of said engine, a set of reversing gears between said engine and said other propeller for driving said other propeller in a direction opposite to the direction of rotation of said engine, a gear casing secured to said engine to provide a support for said propellers and a cover for said rotation reversing gears, an axially movable member extending from a position within said casing to a position between said propellers, a connection between the outer end of said member and said propellers for adjusting the pitch of said propellers upon axial movement of said member, an annular cylinder in said casing, an annular piston on the inner end of said axially movable member reciprocable in said cylinder to move said member, and means controlling the introduction of hydraulic fluid into the space between said piston and the closed end of said cylinder.

5. In combination with an engine and a pair of controllable pitch propellers located at one side of said engine, means between said engine and one of said propellers for driving said one propeller in the same direction as the direction of rotation of said engine, a reversing gear between said engine and the other of said propellers for driving said other propeller in a direction opposite to the direction of rotation of said engine, an axially movable member terminating at one end between said propellers, a freely rotatable connection between said one end of said member and the blades of said propellers for adjusting the pitch of said propellers upon axial movement of said member, an expansible chamber supported by said engine and operatively connected to the opposite end of said member for moving said member to adjust the pitch of said propellers, and means for controlling the introduction of hydraulic fluid into said expansible chamber.

6. In combination with an engine and a pair of controllable pitch propellers located at one side of said engine, means between said engine and one of said propellers for driving said one propeller in the same direction as the direction of rotation of said engine, means between said engine and the other of said propellers for reversing the direction of said other propeller comprising, a driving gear, a driven gear, and a pinion gear between said driving and driven gears, hydraulically actuated means for adjusting the pitch of both of said controllable pitch propellers, and a governor driven by said pinion gear for controlling the action of said hydraulic pitch adjusting means.

7. In combination with an engine and a pair of controllable pitch propellers located at one side of said engine, means between said engine and one of said propellers for driving said propeller in the same direction as the direction of rotation of said engine, means between said engine and the other of said propellers for reversing the direction of rotation of said other propeller comprising a driving gear, a driven gear, a fixed cage between said driving and driven gears, a plurality of beveled gears mounted on said cage and meshing with said driving gear and said driven gear, hydraulically actuated means for adjusting the pitch of both of said controllable pitch propellers, and a governor driven by one of said beveled gears for controlling the actuation of said hydraulically actuated pitch adjusting means.

8. The combination of an engine, an engine power shaft, a propeller shaft driven by said power shaft, a propeller on said propeller shaft, a rotatable sleeve concentric with said propeller shaft, a second propeller carried by said sleeve, gearing between said propeller shaft and said propeller carried sleeve to reverse the direction of rotation of said second propeller with respect to the first mentioned propeller, a gear case enclosing said gearing, a fixed cage in said case supporting elements of said reversing gearing, a thrust bearing for said propeller shaft carried by said cage, and a thrust bearing for said sleeve carried by said gear case, said thrust bearings being disposed upon opposite sides of said reverse gear whereby said thrust bearings absorb both the thrust loads of said gearing and the propulsion thrust loads of said propellers.

9. In combination with an engine and a controllable pitch propeller driven thereby, a power transmitting gear unit between said engine and said propeller, said gear unit including a pair of beveled gears and a plurality of pinion gears mounted in a fixed cage and meshing with said beveled gears, means for changing the pitch setting of said propeller, and a governor for controlling said pitch changing means driven by one of said pinion gears.

10. In combination with an engine and a pair of controllable pitch propellers driven thereby, means driven by said engine and driving said propellers in opposite directions, said means including a pair of beveled gears and a pinion gear mounted upon a fixed axle and meshing with said beveled gears, power operated means for changing the pitch setting of said propellers, and a governor for controlling said power operated means driven by said pinion gear.

ERLE MARTIN.